United States Patent Office 3,066,023
Patented Nov. 27, 1962

3,066,023

MEMBER FOR ELECTROPHOTOGRAPHIC REPRODUCTION AND PROCESS THEREFOR

Heinz Schlesinger, Wiesbaden, Germany, assignor, by mesne assignments, to Azoplate Corporation, Murray Hill, N.J., a corporation of New Jersey

No Drawing. Filed Nov. 20, 1959, Ser. No. 854,228
Claims priority, application Germany Dec. 19, 1958
20 Claims. (Cl. 96—1)

This invention relates to a material for electrophotographic reproduction and, more particularly, to such a material containing a compound belonging to the class of the acyl hydrazones.

Among modern reproduction processes, the electrophotographic process, also known as xerography, is becoming of increasing practical importance. This dry reproduction process is of particular interest, for example, in office duplicating, and it may consist in the application to a material consisting of an electrically conductive support and a photoconductive insulating layer adherent thereto of an electrostatic charge which imparts to the insulating layer the property of light-sensitivity; such light-sensitive material can be used for the production of images by electrophotographic means. The material is exposed to light beneath a pattern or master so that the electrostatic charge is leaked away in those areas of the layer struck by light. The invisible electrostatic image thereby produced is rendered visible, or developed, by powdering over with finely divided, colored, synthetic resin and is then made permanent, or fixed, by the application of heat to the support.

Known materials for the preparation of the photoconductive insulating layer required for the process described above include selenium, sulfur, zinc oxide and organic substances such as anthracene or anthraquinone. A method of preparation has also been employed wherein the photoconductive substances, in association with binders, are dispersed in solvents and the resultant dispersions are applied to electrically conductive supports, i.e. primarily metal foils, and dried. However, the photoelectrically sensitizable material thus obtained has not yet satisfied the extensive demands made upon modern duplicating materials in regard to range of use, reliability, simplicity in handling and, not least in importance, light-sensitivity and storageability qualities.

In accordance with the present invention, it has been found that unexpectedly superior photoelectrically sensitizable layers having a surprising range of practical applications are produced when compounds are used as photoconductive substances which correspond to the general formula $$R_1-CO-NH-N=C\begin{matrix}/R_2\\ \backslash R_3\end{matrix}$$

in which:

$R_1$ is hydrogen, alkyl, aralkyl, aryl, substituted aryl, or a heterocyclic radical of aromatic nature,
$R_2$ is aralkyl, aryl, substituted aryl, or a heterocyclic radical of aromatic nature,
$R_3$ is hydrogen, alkyl, aryl, or a substituted aryl radical, and
$R_2$ and $R_3$ taken together may form a ring system.

Compounds having basic substituents are possessed of particularly desirable properties.

The following formulae are exemplary of the compounds which may be used in accordance with the present invention:

*Formula 1*

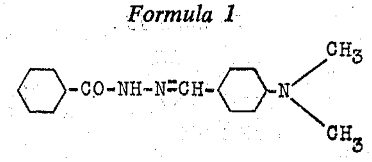

*Formula 2*

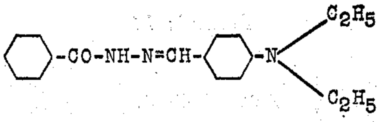

*Formula 3*

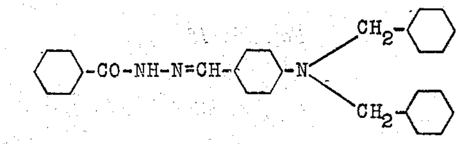

*Formula 4*

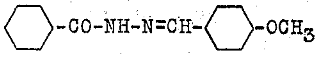

*Formula 5*

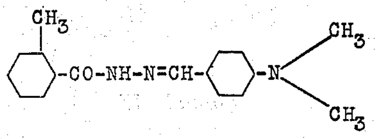

*Formula 6*

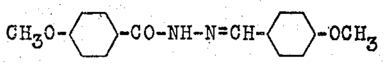

*Formula 7*

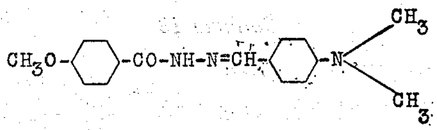

*Formula 8*

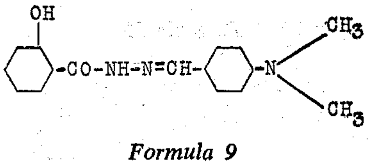

*Formula 9*

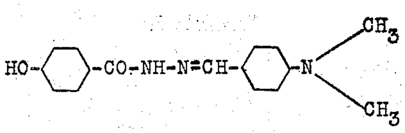

*Formula 10*

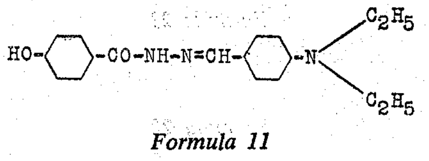

*Formula 11*

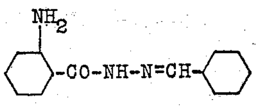

*Formula 12*
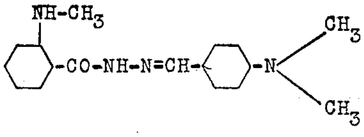
*Formula 13*
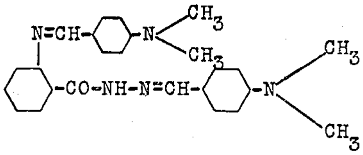
*Formula 14*
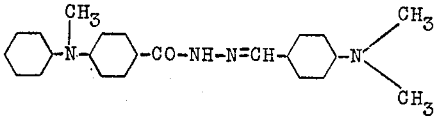
*Formula 15*
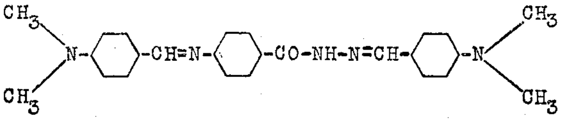
*Formula 16*
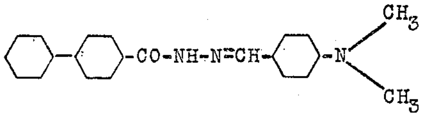
*Formula 17*
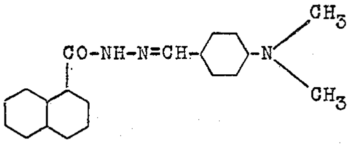
*Formula 18*
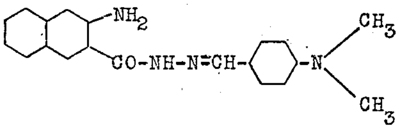
*Formula 19*
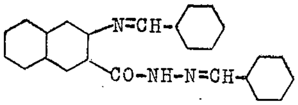
*Formula 20*
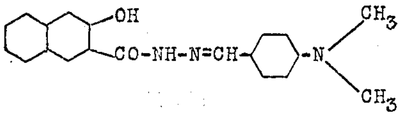
*Formula 21*
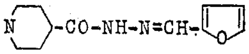
*Formula 22*
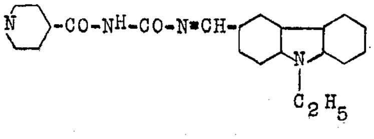
*Formula 23*
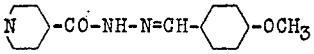
*Formula 24*
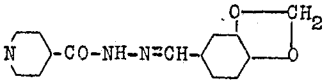
*Formula 25*
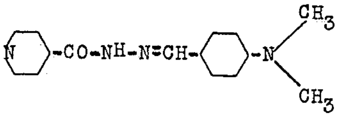
*Formula 26*
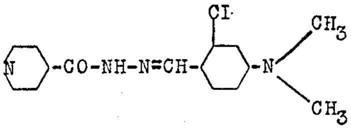
*Formula 27*
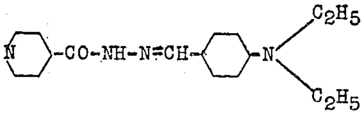
*Formula 28*
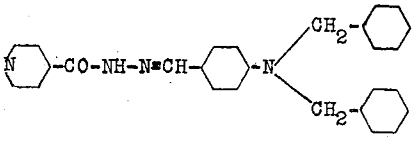
*Formula 29*
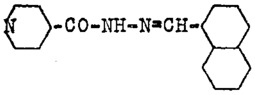
*Formula 30*
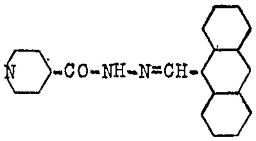
*Formula 31*
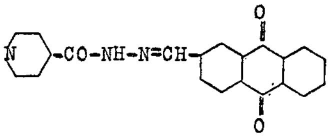
*Formula 32*
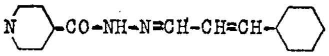
*Formula 33*
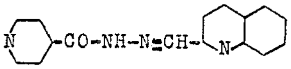
*Formula 34*
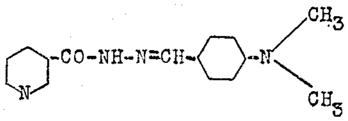

*Formula 35*
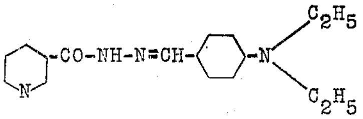
*Formula 36*
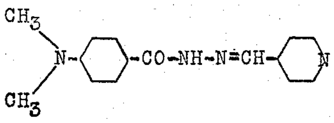
*Formula 37*
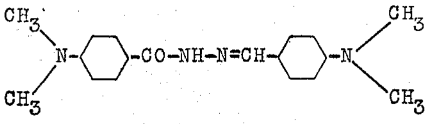
*Formula 38*
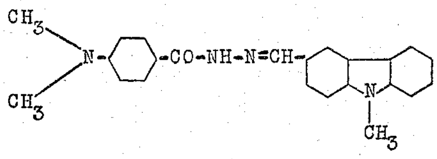
*Formula 39*
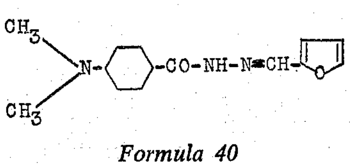
*Formula 40*
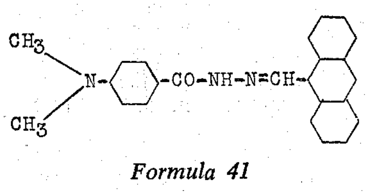
*Formula 41*
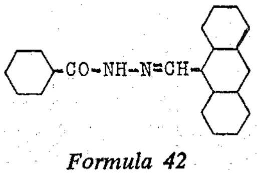
*Formula 42*
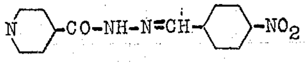
*Formula 43*
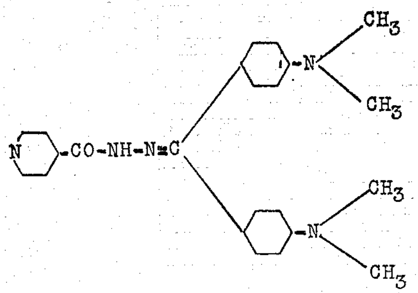
*Formula 44*
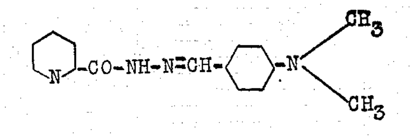
*Formula 45*
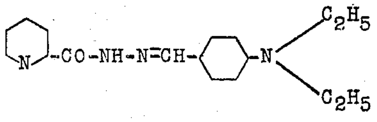
*Formula 46*
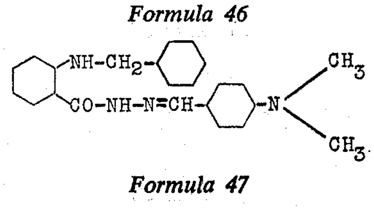
*Formula 47*
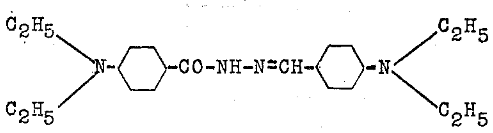
*Formula 48*
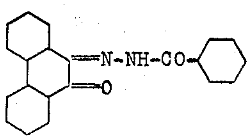
*Formula 49*
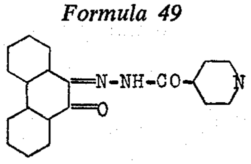
*Formula 50*
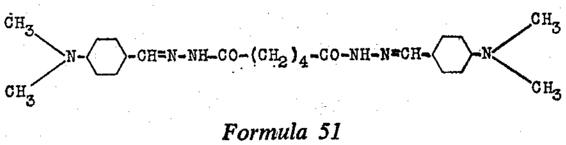
*Formula 51*
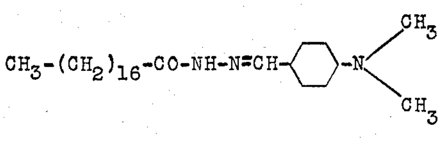
*Formula 52*
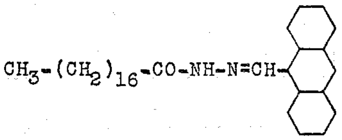
*Formula 53*
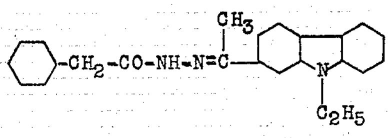
*Formula 54*
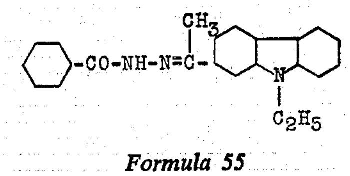
*Formula 55*
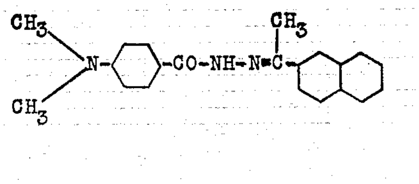

*Formula 56*

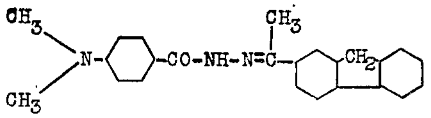

*Formula 57*

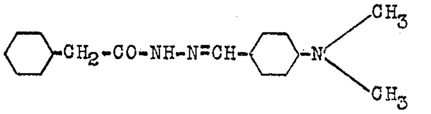

*Formula 58*

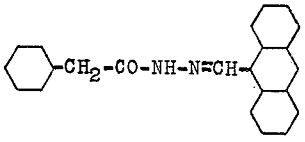

*Formula 59*

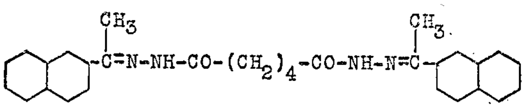

*Formula 60*

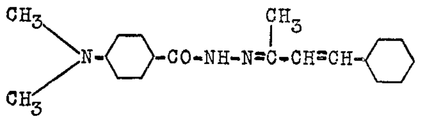

*Formula 61*

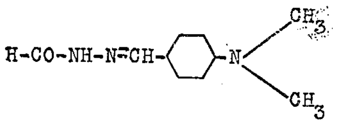

*Formula 62*

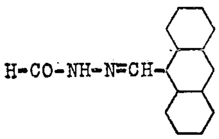

*Formula 63*

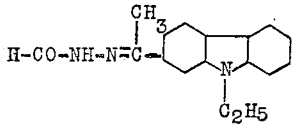

The compounds of the general formulae given above belong to the class of acyl hydrazones and may be prepared by known procedures. The compounds are obtained in a simple manner by the condensation of equimolecular quantities of a carboxylic acid hydrazide with compounds containing a carbonyl function, for example, aldehydes, ketones, and quinones, by boiling in an organic solvent, preferably ethanol.

For example, in the preparation of 4-dimethylamino-benzylidene-benzhydrazide, corresponding to Formula 1 above, a solution of 6.8 grams of benzhydrazide and 7.5 grams of 4-dimethylamino-benzaldehyde in 20 ml. of ethanol is heated under reflux for one hour, during which the reaction product crystallizes out. After it has cooled, it is separated by filtration with suction and is recrystallized from ethanol. The compounds form pale yellow crystals having a melting point of 191–192° C. All the other acyl hydrazones used in accordance with the invention are obtained in an analogous manner, using slight alterations in the conditions obtaining during the reaction where necessary, for example in the quantity of organic solvent or in the duration of heating. For recrystallization, a large number of organic solvents are suitable, with preference being given to ethanol and ethylene glycol monomethylether.

If the compound which contains a carbonyl function reacts with a primary amino compound of a carboxylic acid hydrazide, simultaneous condensation with the amino group is obtained, as is the case, for example, in the production of the acyl hydrazones corresponding to Formulae 13, 15, and 19 above. In such cases, it is advantageous for an excess of the reaction component containing the carbonyl function, for example the aldehyde, to be provided for the condensation in order that better yields may be obtained.

In the list below, some examples are given for the compounds to be used as photoconductive substances in accordance with the invention, the numbers used being the same as those under which the formulae are listed above. The list gives the number of the compound in column 1, starting carboxylic acid hydrazide in column 2, the reaction component with carbonyl group content in column 3, the melting point of the acyl hydrazone in column 4, and the color of the acyl hydrazone in column 5:

| 1 | 2 | 3 | 4 (° C.) | 5 |
|---|---|---|---|---|
| 1 | Benzhydrazide | 4-dimethylaminobenzaldehyde | 191–192 | Pale yellow. |
| 2 | do | 4-diethylaminobenzaldehyde | 180–181 | Yellow. |
| 3 | do | 4-dibenzylaminobenzaldehyde | 202–203 | Do. |
| 4 | do | Anisaldehyde | 157–158 | Colorless. |
| 5 | o-Toluylhydrazide | 4-dimethylaminobenzaldehyde | 151–152 | Yellow. |
| 6 | 4-methoxybenzhydrazide | Anisaldehyde | 173–174 | Colorless. |
| 7 | do | 4-dimethylaminobenzaldehyde | 230–231 | Do. |
| 8 | 2-hydroxybenzhydrazide | do | 264 | Yellow. |
| 9 | 4-hydroxybenzhydrazide | do | 238–239 | Do. |
| 10 | do | 4-diethylaminobenzaldehyde | 234–236 | Do. |
| 11 | 2-aminobenzhydrazide | Benzaldehyde | 197–198 | Colorless. |
| 12 | 2-methylaminobenzhydrazide | 4-dimethylaminobenzaldehyde | 218 | Yellow. |
| 13 | 2-aminobenzhydrazide | do | 243–245 | Do. |
| 14 | N-methyl-diphenylamine-4-carboxylic acid hydrazide | do | 200–201 | Do. |
| 15 | 4-aminobenzhydrazide | do | 279–280 | Do. |
| 16 | Diphenyl-4-carboxylic acid hydrazide | do | 257 | Do. |
| 17 | 1-naphthoic acid hydrazide | do | 201–202 | Colorless. |
| 18 | 2-amino-3-naphthoic acid hydrazide | do | 247–248 | Yellow. |
| 19 | do | Benzaldehyde | 228–230 | Do. |
| 20 | 2-hydroxy-3-naphthoic acid hydrazide | 4-dimethylaminobenzaldehyde | 243–244 | Do. |
| 21 | Pyridine-4-carboxylic acid hydrazide | Furfural | 218–219 | Do. |
| 22 | do | 9-ethyl-carbazole-3-aldehyde | 247–248 | Colorless. |
| 23 | do | Anisaldehyde | 173–174 | Do. |
| 24 | do | Piperonal | 231–233 | Do. |
| 25 | do | 4-dimethylaminobenzaldehyde | 196–197 | Yellow. |
| 26 | do | 2-chloro-4-dimethylaminobenzaldehyde | 213–215 | Do. |
| 27 | do | 4-diethylamino-benzaldehyde | 191–192 | Do. |
| 28 | do | 4-dibenzylamino-benzaldehyde | 201–202 | Do. |
| 29 | do | 1-naphthaldehyde | 212–213 | Do. |
| 30 | do | Anthracene-9-aldehyde | 265–266 | Do. |
| 31 | do | Anthraquinon-2-aldehyde | 301–302 | Do. |

| 1 | 2 | 3 | 4 (° C.) | 5 |
|---|---|---|---|---|
| 32 | do | Cinnamaldehyde | 201–202 | Do. |
| 33 | do | Quinoline-4-aldehyde | 195 | Colorless. |
| 34 | Pyridine-3-carboxylic acid hydrazide | 4-dimethylamino-benzaldehyde | 146–147 | Yellow. |
| 35 | do | 4-diethylamino-benzaldehyde | 153–154 | Do. |
| 36 | 4-dimethylamino-benzhydrazide | Pyridine-4-aldehyde | 235 | Do. |
| 37 | do | 4-dimethylamino-benzaldehyde | 279–280 | Do. |
| 38 | do | 9-methyl-carbazole-3-aldehyde | 256–257 | Colorless. |
| 39 | do | Furfural | 255–256 | Do. |
| 40 | do | Anthracene-9-aldehyde | 308 | Yellow. |
| 41 | Benzhydrazide | do | 258–259 | Do. |
| 42 | Pyridine-4-carboxylic acid hydrazide | 4-nitro-benzaldehyde | 278–279 | Do. |
| 43 | do | 4,4′-bis-dimethyl-amino-benzophenone | 196–197 | Do. |
| 44 | Pyridine-2-carboxylic acid hydrazide | 4-dimethyl amino-benzaldehyde | 206–207 | Do. |
| 45 | do | 4-diethylamino-benzaldehyde | 127 | Do. |
| 46 | 2-benzyl-amino-benzhydrazide | 4-dimethylamino-benzaldehyde | 188 | Do. |
| 47 | 4-diethylamino-benzhydrazide | 4-diethylamino-benzaldehyde | 182 | Do. |
| 48 | Benzhydrazide | 9,10-phenanthrene-quinone | 192–193 | Orange-colored. |
| 49 | Pyridine-4-carboxylic acid hydrazide | do | 214 | Do. |
| 50 | Adipic acid dihydrazide | 4-dimethylamino-benzaldehyde | 293–296 | Colorless. |
| 51 | Stearic acid hydrazide | do | 95–96 | Pale yellow. |
| 52 | do | Anthracene-9-aldehyde | 149–150 | Yellow. |
| 53 | Phenylacetic acid hydrazide | 2-acetyl-9-ethyl-carbazole | 173 | Colorless. |
| 54 | Benzhydrazide | do | 184 | Do. |
| 55 | 4-dimethyl-amino-benzhydrazide | 2-acetyl-naphthalene | 218 | Pale yellow. |
| 56 | do | 2-acetylfluorene | 267–268 | Yellow. |
| 57 | Phenyl-acetic acid hydrazide | 4-dimethylamino-benzaldehyde | 187 | Colorless. |
| 58 | do | Anthracene-9-aldehyde | 258 | Yellow. |
| 59 | Adipic acid dihydrazide | 2-acetyl-naphthalene | 236–237 | Colorless. |
| 60 | 4-dimethyl-amino-benzhydrazide | Benzal-acetone | 199–200 | Pale yellow. |
| 61 | Formhydrazide | 4-dimethylamino-benzaldehyde | 161–162 | Yellow. |
| 62 | do | Anthracene-9-aldehyde | 274–275 | Do. |
| 63 | do | 2-acetyl-9-ethyl-carbazole | 220 | Do. |

The compounds to be used in accordance with the invention have very good photo-conductivity and are particularly suitable for the preparation of homogeneous coatings of unlimited shelf-life.

For the preparation of the photoconductive insulating layers it is advantageous for the acyl hydrazones or mixtures of several acyl hydrazones being used in accordance with the invention to be used in solution with organic solvents, e.g. benzene, acetone, methylene chloride, ethylene glycol monomethylether and others; mixtures of solvents can also be used. Also, the acyl hydrazones used in accordance with the invention may be used in admixture with other organic photoconductive substances. Also, the acyl hydrazones to be used in accordance with the invention can be applied in suspension form to the supporting material.

As has further been discovered, it can be an advantage in the production of the photoconductive insulating layers for organic colloids to be used in association with the compounds corresponding to the general formula given above. The following appropriately may be mentioned; natural and synthetic resins, e.g. balsam resins, phenol resins modified with colophony and other resins of which colophony constitutes the major part, coumarone resins and indene resins and the substances covered by the collective term "synthetic lacquer resins," which according to the Kunststofftaschenbuch (Plastic Pocket Book) published by Saechtling-Zebrowski (11th edition, 1955, page 212 et seq.) include processed natural substances, each as cellulose ether; polymers such as polyvinyl chlorides, polyvinyl acetate, polyvinyl acetals, polyvinyl ethers, polyacrylic and polymethacrylic esters, as also polystyrene and isobutylene; polycondensates, e.g. polyesters, such as phthalate resins, alkyd resins, maleic acid resins maleic acid/colophony/mixed esters of higher alcohols, phenol-formaldehyde resins, particularly colophony-modified phenol-formaldehyde condensates, urea-formaldehyde resins, melamine-formaldehyde condensates, aldehyde resins, ketone resins of which particular mention is to be made of AW 2 resins of the Badische Anilin- und Sodafabrik, xylene formaldehyde resins and polyamides; polyadducts, such as polyurethanes.

If the acyl hydrazones to be used in accordance with the invention are used in association with organic colloids, the proportion of resin to photoconductive substance can vary very greatly. The use of mixtures of approximately equal parts of resin and acyl hydrazone has been found advantageous. If such mixtures of approximately equal parts of resin and acyl hydrazone are used, their solution after drying in most cases gives homogeneous, transparent layers which are considered to be solid solutions.

The base materials used as electroconductive supports may be any that satisfy the requirements of xerography, e.g. metal or glass plates, paper or plates or foils made of electrically conductive resins or plastic resins. If paper is to be used as support for the photoconductive layer, pretreatment of the paper for the photoconductive insulating layers against penetration of the coating solution is advisable, e.g. with methyl cellulose in aqueous solution or polyvinyl alcohol in aqueous solution or with a solution in acetone and methyl ethyl ketone of a copolymer of acrylic acid methyl ester and acrylonitrile or with solutions of polyamides in aqueous alcohols. Aqueous dispersions of substances such as are suitable for the pretreatment of the paper surface may also be used.

The solutions of the compounds of the acyl hydrazone class used in accordance with the invention, with or without the resins, are applied to the supports in the usual manner, for example by spraying, by direct application, by means of rollers, etc., and then dried so as to produce a homogeneous photoconductive layer on the electroconductive support.

After an electrostatic charge has been applied, i.e. after the layer has been charged positively or negatively by means of, for example, a corona discharge, it is light sensitive and can be advantageously used with long-wave U.V. light of 3600–4200 A. for electrophotographic image-production. Very short exposure under a master to a high-pressure mercury lamp will give good images. It has further been found that the spectral sensitivity of the photoconductive layer can be extended by means of sensitizers into the visible part of the spectrum. Dyestuffs in particular are suitable, i.e. optical sensitizers. The amount of sensitizer to be added to the photoconductive substance depends on the type of sensitizer and on the composition of the electrophotographic layer and it may vary within wide limits. For example good sensitizing effects are obtained with an addition of 1% of Rhodamine B Extra (Schutz' "Farbstofftabellen," 7th edition, 1st vol., No. 864). Particularly suitable as sensitizers are dyestuffs of which for readier identification the number is given under which they are listed in Schultz' "Farbstofftabellen" (7th edition, 1st vol., 1931). The following are given as examples of effective sensitizers: triarylmethane dyestuffs such as Brilliant Green (No. 760, p. 314), Victoria Blue B (No. 822, p. 347), Methyl Violet (No. 783, p. 327), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Rhodamine G Extra (No. 865, p. 366), Sulphorhodamine B (No. 863, p. 364), and Fast Acid Eosin G (No. 870, p. 368), as also phthaleins such as Eosin S (No. 883, p. 375) Eosin A (No. 881, p. 374), Erythrosin (No. 886, p. 376), Phloxin (No. 890, p. 378), Rose Bengal (No. 889, p. 378), and Fluorescein (No. 880, p. 373); thiazine dyestuffs such as Methylene Blue (No. 1038, p. 449); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptocyanine (No. 927, p. 397); quinone dyestuffs and ketone dyestuffs such as Alizarin (No. 1141, p. 499), Alizarin Red S (No. 1145, p. 502) and Quinizarine (No. 1148, p. 504); cyanine dyestuffs, e.g. Cyanine (No. 921, p. 394) and chlorophyll.

The production of images by electrophotographic means is carried out as follows: when the photoconductive layer has been charged, by means of, for example, a corona discharge with a charging apparatus maintained at 6000–7000 volts, the support, e.g. paper or aluminum foil or plastic foil, with the sensitized layer, is exposed to light under a master or by episcopic or diascopic projection and is then dusted over in known manner with a resin powder colored with carbon black. The image that now becomes visible can easily be wiped off. It therefore must be fixed; it can, for example, be briefly heated to about 120° C. or, according to the fusion temperature of the developer used, it can be exposed to infra-red radiation. The temperature required is less if the heat treatment is carried out in the presence of vapors of solvents such as trichlorethylene, carbon tetrachloride or ethyl alcohol. The fixing of the powder image can also be done by steam treatment. From positive masters, positive images characterized by good contrast are produced.

A particular advantage of the electrophotographic images prepared in accordance with the invention resides in the fact that after being fixed these images can be converted into a printing plate, if the support, e.g. paper or plastic foil, is wiped over with a solvent for the photoconductive layer, e.g. alcohol or acetic acid. This treatment removes the image-free parts of the layer, so that the support can now be wetted with water. It is then inked up in known manner with greasy ink, and this ink adheres only to the image parts. In this way, positive printing plates are obtained which can be set up in an offset machine and used for printing.

If transparent supports are used, the electrophotographic images can also be used as masters for the production of further copies of any sort of light-sensitive sheets. In this respect, the photoconductive compounds to be used as provided by the invention are superior to the substances used hitherto, such as selenium or zinc oxide, inasmuch as the latter give only cloudy layers not capable of further reproduction, because solid solutions can not be produced with these materials, and suspensions only are possible.

If translucent supports are used for photoconductive layers such as are provided by the invention, reflex images can be produced also. The possibility of a reflex copy is also an advantage over the known art.

Moreover the photoconductive layers prepared in accordance with the invention have a further important advantage in that they can be charged positively as well as negatively. With positive charging the images are particularly good and the evolution of ozone can scarcely be detected.

The invention will be further illustrated by reference to the following specific examples:

(1) 0.5 g. of 4-diethylaminobenzylidene nicotinic acid hydrazide, corresponding to Formula 35, and 0.5 g. of ketone resin, e.g. the product commercially available under the trade name Kunstharz SK, are dissolved in 15 ml. of ethylene glycol monomethylether and the solution is applied to paper, the surface of which has been pretreated against the penetration of organic solvents, and is dried. With the paper thus coated, a direct image is produced by the electrophotographic process. The dry coating is provided by a corona discharge with a negative electric charge by means of a charging device maintained at approximately 6000 volts. It is then exposed under a positive master to the light of a high-pressure mercury lamp and powdered over with a developer in known manner. This developer consists of toner and carrier. The toner is composed of a low melting-point polystyrene, colophony and carbon-black, with or without an organic dyestuff additive such as spirit-soluble nigrosine (Schultz "Farbstofftabellen," 7th edition, 1st vol., No. 985); the components are melted together, ground and fractionated by screening. The most suitable fraction is that with a grain size of 20–60$\mu$. The toner, prepared in this way, is mixed with a carrier substance of such nature that the toner becomes triboelectrically charged with a charge that is the opposite of that produced on the paper, e.g. glass balls or iron filings. A positive image is produced which is fixed by slight heating. The ground of the paper is brightened by the substance applied as a coating.

(2) The coating of paper is carried out as described in Example 1 and the coating is provided with a positive charge by the corona discharge. After the paper foil has been exposed to light under a master, the image produced thereon is developed by powdering over with a developer, as described in Example 1, but as carrier glass balls covered with maleic acid resin are used. The maleic acid resin used for the coating of the glass balls is, advantageously, the product commercially available under the registered trademark "Beckacite" K 105. A very good, positive image of the master, rich in contrast, is likewise obtained.

(3) 0.5 g. of 4-dimethylaminobenzylideneisonicotinic acid hydrazide corresponding to Formula 25 and 0.5 g. of courmarone resin, e.g. the commercial product Cumaronharz 601/90, are dissolved in 15 ml. of ethylene glycol monomethylether and the solution is applied to a paper foil. After evaporation of the solvent, an electrophotographic image is produced as described in Example 1.

(4) 0.5 g. of 4-dimethylaminobenzylidene-benzhydrazide, corresponding to Formula 1, and 0.5 g. of phenolformaldehyde resin, e.g. 0.5 g. of the product marketed under the registered trademark Alnovol 429 K, are dissolved in 15 ml. of ethyleneglycol monomethyl ether. The application of the solution to a paper foil and the preparation of the electrophotographic image are as described in Example 1.

(5) The procedure described in Example 1 is followed, but for the coating of the paper a solution of 0.5 g. of 4-dimethylaminobenzylidene nicotinic acid hydrazide, corresponding to Formula 34, and 0.5 g. of zinc resin, e.g. the product marketed under the trade name Erkazit Zinkharz 165, in 15 ml. of ethylene glycol monomethylether is used.

(6) 0.5 g. of 4-diethylaminobenzylidene-benzhydrazide, corresponding to Formula 2, and 0.5 g. of ketone resin, e.g. the product marketed under the trade name Kunstharz SK, mentioned above in Example 1, are dissolved in 15 ml. of ethylene glycol monomethylether. This solution is applied to transparent paper, the surface of which has been pretreated against the penetration of organic solvents, and is then dried. On this coated transparent paper, images are produced by the electrophotographic process which are fixed by heating or by treatment with trichloroethylene vapors. They can then be used as intermediate originals for further dpulication, e.g. for copying on diazo paper.

(7) 0.5 g. of 4-methoxy-benzylidene-benzhydrazide corresponding to Formula 4 and 0.5 g. of non-hydrolyzed ketone/aldehyde condensation resin, e.g. the product marketed under the trade name Kunstharz AP, are dissolved in 15 ml. of ethylene glycol monomethylether and applied to a superficially roughened aluminum surface. After the solvent has evaporated, a coating is left that is firmly adherent to the surface of the foil. With this coated foil the procedure described in Example 1 is followed and a positive image is obtained on the aluminum surface once the powder image has been fixed. This image can be converted into a printing plate if the aluminum foil is wiped over with 50 percent acetic acid or 60 percent ethanol solution, rinsed down with water and then inked up with 1 percent phosphoric acid and greasy ink. A positive printing plate is obtained which can be set up in an offset machine and used for printing.

(8) A mixture consisting of 0.1 g. of 4-dimethylaminobenzylidene-2′-toluylhydrazide, corresponding to Formula 5,
0.1 g. of 2-chloro-4-dimethylaminobenzylidene-isonicotinic acid hydrazide, corresponding to Formula 26, and
0.1 g. of furfurylidene-(2)-4′-dimethylamino-benzhydrazide, corresponding to Formula 39, is dissolved in 15 ml. of ethylene glycol monomethylether. The solution is applied to an aluminum foil and then dried to form a coating that is firmly adherent to the metal. The preparation of an electrophotographic image is in a manner known per se.

(9) 0.5 g. of 4-diethylaminobenzylidene nicotinic acid hydrazide, corresponding to Formula 35, 0.5 g. of ketone resin, e.g. the product mentioned above in Example 1 marketed under the trade name Kunstharz SK, and 5 mg. of Rhodamine B Extra (Schultz' "Farbstofftabellen," 7th edition, 1st vol., No. 864) are dissolved in 15 ml. of ethylene glycol monomethylether. This solution is applied to paper, the surface of which has been treated against the penetration of organic solvents and is dried. With this material, an electrophotographic image is produced by the method described in Example 1, but instead of the high-pressure mercury lamp, a 100-watt incandescent bulb is used.

(10) 8 g. of ketone resin, e.g. the product commercially available under the trade name Kunstharz EM, are dissolved in 120 ml. of ethanol. To this solution, 8 g. of anthracene-9-aldehyde-isonicotinic acid hydrazone, corresponding to Formula 30, are added. The suspension thus produced is very finely ground in a ball mill and is then coated upon paper that has been pretreated against the penetration of organic solvent and is then dried. Electrophotographic images are prepared with the coated paper by the process described in Example 1.

If instead of the 8 g. of the compound corresponding to Formula 30, the same quantity of N,N′-bis-(4-dimethylaminobenzylidene)-adipic acid dihydrazide, corresponding to Formula 50 is used, the result is the same.

(11) 10 g. of after-chlorinated polyvinyl chloride, e.g. the product commercially available under the registered trademark Rhenoflex, are dissolved in 100 ml. of methyl-ethyl-ketone. To this solution 10 g. of 4-dimethylamino-benzylidene-benzhydrazide, corresponding to Formula 1, dissolved in 50 ml. of toluene are added. With the mixture thus obtained, paper is coated by means of a hopper device. When the coated solution has dried to a firmly adherent homogeneous layer, direct images are produced electrophotographically on this paper by the method described in Example 1. The electrostatic charge leaks away very quickly in those places where the photoconductive coating is struck by the light. Light-sensitivity is good; images rich in contrast are obtained episcopically from double-sided masters.

It will be obvious to those skilled in the art that many modifications may be made within the scope of the present invention without departing from the spirit thereof, and the invention includes all such modifications.

What is claimed is:

1. An electrophotographic material comprising an electrically conductive support layer and a photoconductive insulating layer, the latter comprising a compound having the formula $$R_1-CO-NH-N=C\begin{matrix} \diagup R_2 \\ \diagdown R_3 \end{matrix}$$

in which $R_1$ is selected from the group consisting of hydrogen, alkyl, aralkyl, aryl, and heterocyclic groups of aromatic nature,
$R_2$ is selected from the group consisting of aralkyl, aryl, and heterocyclic groups of aromatic nature,
$R_3$ is selected from the group consisting of hydrogen, alkyl, and aryl groups and
$R_2$ and $R_3$ taken together form a ring system, the support layer having the function of conducting the charge leaked off of the insulating layer when the latter is exposed to light.

2. An electrophotographic material according to claim 1 in which the photoconductive layer contains a dyestuff sensitizer.

3. An electrophotographic material according to claim 1 in which the photoconductive layer contains an organic colloid.

4. An electrophotographic material comprising an electrically conductive support layer and a photoconductive insulating layer, the latter comprising a compound having the formula $$R-CO-NH-N=CH-R_1$$

in which R and $R_1$ are aryl groups, the support layer having the function of conducting the charge leaked off of the insulating layer when the latter is exposed to light.

5. An electrophotographic material according to claim 4 in which the photoconductive layer contains a dyestuff sensitizer.

6. An electrophotographic material according to claim 4 in which the photoconductive layer contains an organic colloid.

7. An electrophotographic material comprising an electrically conductive support layer and a photoconductive insulating layer, the latter comprising a compound having the formula $$R-CO-NH-N=CH-R_1$$

in which R and $R_1$ are heterocyclic groups, the support layer having the function of conducting the charge leaked off of the insulating layer when the latter is exposed to light.

8. An electrophotographic material comprising an electrically conductive support layer and a photoconductive insulating layer, the latter comprising a compound having the formula $$R-CO-NH-N=CH-R_1$$

in which R is heterocyclic and $R_1$ is an aryl group, the support layer having the function of conducting the charge leaked off of the insulating layer when the latter is exposed to light.

9. An electrophotographic material comprising an electrically conductive support layer and a photoconductive insulating layer, the latter comprising a compound having the formula $$R-CO-NH-N=CH-R_1$$

in which R is an aryl group and $R_1$ is a heterocyclic group, the support layer having the function of conducting the charge leaked off of the insulating layer when the latter is exposed to light.

10. An electrophotographic material comprising an electrically conductive support layer and a photoconductive insulating layer, the latter comprising a compound having the formula $$R-CO-NH-N=R_1$$

in which R and $R_1$ are aryl groups, the support layer having the function of conducting the charge leaked off of the insulating layer when the latter is exposed to light.

11. A photographic reproduction process which comprises exposing a supported, electrically charged, photoconductive insulating layer to light under a master and developing the resulting image, the photoconductive layer comprising a compound having the formula $$R_1\text{—CO—NH—N}=C\begin{matrix} \diagup R_2 \\ \diagdown R_3 \end{matrix}$$

in which $R_1$ is selected from the group consisting of hydrogen, alkyl, aralkyl, aryl, and heterocyclic groups of aromatic nature, $R_2$ is selected from the group consisting of aralkyl, aryl, and heterocyclic groups of aromatic nature, $R_3$ is selected from the group consisting of hydrogen, alkyl, aryl, and aryl groups, and $R_2$ and $R_3$ taken together form a ring system.

12. A process according to claim 11 in which the photoconductive layer contains a dyestuff sensitizer.

13. A process according to claim 11 in which the photoconductive layer contains an organic colloid.

14. A photographic reproduction process which comprises exposing a supported electrically charged photoconductive insulating layer to light under a master and developing the resulting image, the photoconductive layer comprising a compound having the formula $$R\text{—CO—NH—N}=\text{CH—}R_1$$

in which R and $R_1$ are aryl groups.

15. A process according to claim 14 in which the photoconductive layer contains a dyestuff sensitizer.

16. A process according to claim 14 in which the photoconductive layer contains an organic colloid.

17. A photographic reproduction process which comprises exposing a supported, electrically charged, photoconductive insulating layer to light under a master and developing the resulting image, the photoconductive layer comprising a compound having the formula $$R\text{—CO—NH—N}=\text{CH—}R_1$$

in which R and $R_1$ are heterocyclic groups.

18. A photographic reproduction process which comprises exposing a supported, electrically charged, photoconductive insulating layer to light under a master and developing the resulting image, the photoconductive layer comprising a compound having the formula $$R\text{—CO—NH—N}=\text{CH—}R_1$$

in which R is a heterocyclic group and $R_1$ is an aryl group.

19. A photographic reproduction process which comprises exposing a supported, electrically charged insulating layer to light under a master and developing the resulting image, the photoconductive layer comprising a compound having the formula $$R\text{—CO—NH—N}=\text{CH—}R_1$$

in which R is an aryl group and $R_1$ is a heterocyclic group.

20. A photographic reproduction process which comprises exposing a supported, electrically charged, photoconductive insulating layer to light under a master and developing the resulting image, the photoconductive layer comprising a compound having the formula $$R\text{—CO—NH—N}=R_1$$

in which R and $R_1$ are aryl groups.

References Cited in the file of this patent

UNITED STATES PATENTS

| | | |
|---|---|---|
| 2,297,691 | Carlson | Oct. 6, 1942 |
| 2,663,636 | Middleton | Dec. 22, 1953 |

FOREIGN PATENTS

| | | |
|---|---|---|
| 1,176,457 | France | Nov. 24, 1958 |

OTHER REFERENCES

Sacconi: J.A.C.S., 75, 5434—5 (1953).

Winslow et al.: J.A.C.S., 77, 4751–6 (1955).

Lyons et al.: J. Chem. Soc. (1957), pages 3648–3668.